Jan. 22, 1924.

W. E. STEELE

AUTOMOBILE LIGHT

Filed Jan. 24, 1923

1,481,629

Inventor
W. E. Steele

Patented Jan. 22, 1924.

1,481,629

UNITED STATES PATENT OFFICE.

WILLIAM E. STEELE, OF OLYMPIA, WASHINGTON.

AUTOMOBILE LIGHT.

Application filed January 24, 1923. Serial No. 614,690.

*To all whom it may concern:*

Be it known that WILLIAM E. STEELE, a citizen of the United States, residing at Olympia, in the county of Thurston and State of Washington, has invented certain new and useful Improvements in Automobile Lights, of which the following is a specification.

This invention relates to improvements in vehicle head lights or spot lights, and its principal object is to provide means adapted to be adjusted to various positions by the driver so as to enable him to transversely light the roadway and to throw a narrow beam of light a greater or less distance ahead of the vehicle.

The use of glaring head lights, which are not susceptible to the manipulation just described, has a blinding effect upon the driver of an approaching vehicle and results in accidents. This invention aims to overcome this objection.

I accomplish these and other objects by the arrangement and combination of parts, as will be hereinafter more fully described and explained in the following specification and pointed out in the claims.

In the accompanying drawings:—

Figure 1:
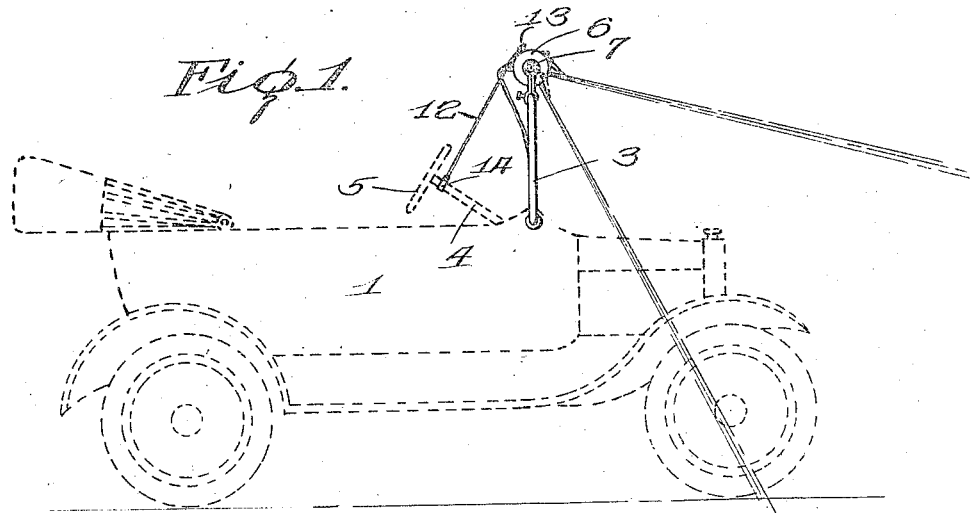
Fig. 1 is a side elevation of an ordinary automobile, showing my improvement applied thereto.
Figure 2:
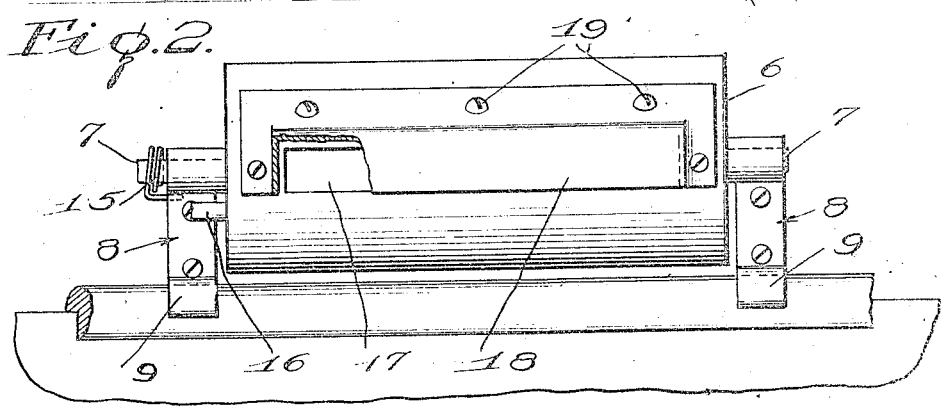
Fig. 2 is an enlarged fragmentary view of an automobile wind shield, illustrating the position of the invention.
Figures 3, 4:
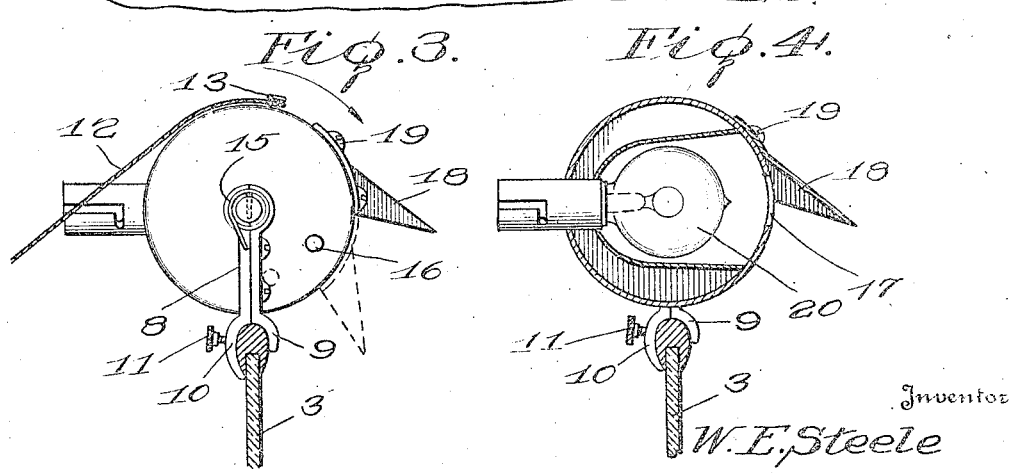
Fig. 3 is an end view.
Fig. 4 is a vertical transverse section.

Referring to the drawings, numeral 1 indicates an automobile body, 3 the wind shield thereof, 4 the steering post, and 5 the steering wheel. 6 indicates a cylindrical housing having end pintles 7, which are revolubly mounted in removable brackets 8, each being provided with legs 9 and 10. The legs 9 in the instance shown, are shorter than the legs 10 for a purpose presently to be explained. Passing through the legs 10 are knurled headed screws 11 to bind the brackets to the top of the wind shield.

12 indicates a flexible member such as a small chain, cord or the like, one end of which is secured as at 13 to the housing 6, and its opposite end secured at 14 to the steering post 4. 15 indicates a spring around one of the pintles 7, the tension of which tends to normally rotate the housing 6 in the direction of the arrow shown in Fig. 1 until a limit stop 16 contacts with one of the brackets 8. 17 indicates a relatively narrow longitudinal slit in the front of the housing 6 and over the same is an inclined shade 18, removably attached to the housing by means of screws 19. 20 indicates a lamp or bulb mounted within the housing in rear of the longitudinal slit, the lamp being arranged in the lighting circuit of the vehicle. When in normal position, the bottom of the shade is about on a horizontal plane with the bottom wall of the slot 17.

From the foregoing, it is believed that the construction of the lamp will be clear to others skilled in the art. To attach the device to a wind shield of an ordinary automobile, the legs 9 and 10 straddle the upper rail of the wind shield and the binding screws 11 are tightened to adjusted position.

The ordinary automobile top or cover will not ordinarily interfere with the attachment of the lamp to the wind shield, particularly for the reason that the outer legs 9 are shorter than the inner legs 10, which permits the securing of the brackets at any point within a radius of ninety degrees. For example, considering Fig. 1, if the screws 11 be turned slightly so as to release the friction of the brackets on the wind shield, the top of the housing 6 may be partially turned so that the lamp may be positioned at right angle to the wind shield if necessary, and then the bolts screwed up tightly. In this case, the limit stop 16 would be changed correspondingly so that when the spring 15 turned the housing in its driving position, the limit stop would hold it there. The driving position of the lamp is preferably such that the rays of light will be thrown about one hundred or so feet ahead of the vehicle, the long slit in the housing serving to throw a broad ribbon of light ahead of the machine. On the approach of another vehicle, the driver simply partially rotates the housing by means of the member 12, which turns the shade 18 in such a position as to throw the broad ribbon of light just a little ahead of the vehicle, which serves to relieve the approaching driver of any undesirable glare, but will, at the same time, afford perfect illumination for the driver. The shade 18 is preferably made removable from the housing 6 to readily permit insertion of new bulbs when the old ones burn out.

While the use of my improved device is especially adapted to spot lights, it is apparent that the same principle may be applied to ordinary head lights of a vehicle, connection being provided between the front head lights and the driver to change the position of the lamp. The main principle involved in the invention is that in whatever position the housing may be, the roadway ahead of the driver is illuminated across its entire width by a relatively narrow ribbon of light, and at no time is the driver of the vehicle in darkness or uncertainty as to his forward course; yet at the same time, no blinding glare need ever be encountered by the driver of an approaching vehicle.

While I have shown and described a particular form of embodiment of my invention, I am aware that many minor changes therein will readily suggest themselves to others skilled in the art without departing from the spirit and scope of my invention. I, therefore, desire to avoid being limited to the exact form of embodiment which I have herein shown and described.

What I claim as new, and desire to protect by Letters Patent, is:

1. A lamp, including a housing, brackets for rotatably supporting the housing, said brackets being formed to clamp upon the frame of an automobile wind shield, said housing being formed with a narrow opening extending throughout the length of the housing, a source of light within the housing, a flexible member for rotating the housing in one direction, and a spring for rotating the housing in the opposite direction, the rotation of the housing changing the direction of light rays from the source of light in their projection beyond the housing.

2. A lamp, including a housing, brackets for rotatably supporting the housing, said brackets being formed to clamp upon the frame of an automobile wind shield, said housing being formed with a narrow opening extending throughout the length of the housing, a source of light within the housing, and a light deflector secured to the casing and projecting forwardly and downwardly to overlie the slot in spaced relation to the casing, a flexible member for rotating the housing in one direction, the rotation of the housing changing the direction of light rays from the source of light in their projection beyond the housing.

In testimony whereof I affix my signature.

WILLIAM E. STEELE.